United States Patent [19]

Jacks et al.

[11] Patent Number: 4,464,296

[45] Date of Patent: Aug. 7, 1984

[54] SOLUBILIZATION OF DRY PROTEIN IN AQUEOUS OR ACIDIC MEDIA AFTER TREATMENT WITH CONCENTRATED HYDROGEN PEROXIDE

[75] Inventors: Thomas J. Jacks; Thomas P. Hensarling, both of New Orleans; Linda L. Muller, Lake Charles, all of La.

[73] Assignee: The United States of America as represented by Secretary of Agriculture, Washington, D.C.

[21] Appl. No.: 539,860

[22] Filed: Oct. 7, 1983

[51] Int. Cl.$^3$ ............................................... A23J 1/14
[52] U.S. Cl. ................................. 260/123.5; 426/634; 426/656
[58] Field of Search ..................................... 260/123.5

[56] References Cited

U.S. PATENT DOCUMENTS

| | | | |
|---|---|---|---|
| 2,198,538 | 4/1940 | Kajita et al. | 260/123.5 X |
| 2,246,466 | 6/1941 | Julian et al. | 260/123.5 |
| 3,361,574 | 1/1968 | Paulsen | 260/123.5 X |
| 3,361,575 | 1/1968 | Paulsen | 260/123.5 X |
| 4,036,996 | 7/1977 | Chandler et al. | 260/123.5 X |
| 4,038,437 | 7/1977 | Chandler et al. | 260/123.5 X |
| 4,264,493 | 4/1981 | Battista | 260/123.5 X |
| 4,349,470 | 9/1982 | Battista | 260/123.5 X |

*Primary Examiner*—Howard E. Schain
*Attorney, Agent, or Firm*—M. Howard Silverstein; David G. McConnell; Raymond C. Von Bodungen

[57] ABSTRACT

A novel process for increasing the solubility of dry oilseed protein is disclosed. Proteins, such as, peanut, pumpkin, and soybean are mixed with 30% hydrogen peroxide at about 1:20 ratio. The mixture is centrifuged at approximately 2000 g for about 15 minutes to clarify the solution. The supernatant is dialyzed against water containing catalase and the dialysate is freeze-dried.

8 Claims, No Drawings

SOLUBILIZATION OF DRY PROTEIN IN AQUEOUS OR ACIDIC MEDIA AFTER TREATMENT WITH CONCENTRATED HYDROGEN PEROXIDE

BACKGROUND OF THE INVENTION (1) Field of the Invention

This invention relates to a treatment of proteins of biological origin to increase their solubilities.

(2) Description of the Prior Art

The abundant storage proteins of oilseeds are insoluble in water or in mildly acidic (pH 4.7) aqueous solutions. They are soluble in strongly acidic (less than pH 3), alkaline (more than pH 9), and aqueous salt solutions. For most uses in food systems, however it is required to render oilseed proteins soluble in water or mildly acidic solutions. Consequently, treatment of oilseed proteins to render them soluble in water or mildly acidic solutions is highly desirous.

Weak solutions of hydrogen peroxide (less than 3%) have been used to bleach fish and plant proteins *during their isolation*, but the use of concentrated hydrogen peroxide (30%) to increase solubilities of the resultant isolated, dry proteins in water or mildly acid solutions has never been attempted.

SUMMARY OF THE INVENTION

A process for increasing the solubility of dry purified oilseed protein is disclosed. The protein is mixed with hydrogen peroxide and the mixture centrifuged for sufficient time to effect clarification. The supernatant is dialyzed against water containing sufficient catalase to remove the hydrogen peroxide and the dialysate is freeze-dried. The resultant treated protein is more soluble in aqueous or acid media than it was prior to the treatment. Increases of dried oilseed protein solubilities of 8.5 to 200 fold have been experienced by this new and novel process.

DESCRIPTION OF THE PREFERRED EMBODIMENTS

We have now discovered a treatment to cause an increase of solubility of oilseed storage proteins in water up to 40-fold and an increase in mild acid (pH 4.7) of 200-fold, depending upon the particular oilseed protein, after they have been isolated and dried. By the method of the instant invention, the isolated, dry protein is exposed to 30% hydrogen peroxide, the wet suspension is dialyzed to remove the hydrogen peroxide and is freeze-dried.

DESCRIPTION OF THE TABLES

Table I shows a comparison of concentrations of hydrogen peroxide and the amounts of protein solubilized, when the amount solubilized by 30% hydrogen peroxide is set at 100.

Table II shows oilseed protein solubilities before and after treatment of isolated oilseed proteins with 30% hydrogen peroxide, illustrating effects of treatment. Increases in solubilities are also shown.

EVALUATION OF THE TREATMENT SYSTEM OF THE PRESENT INVENTION

Saturated solutions of treated and untreated proteins in either water (arachin and cucurbitin) or 0.05M acetate buffer pH 4.7 (glycinin) were prepared with a Tekmar Tissumizer (disperser) and centrifuged at 2000 g for 15 min. Supernatants were analyzed for protein by Kjeldahl analysis. Solubilities of the proteins before and after treatment were compared.

EXAMPLE 1

Peanut storage protein (arachin) was isolated by the method of Neucere (N. J. Neucere, Anal. Biochem. 27:15, 1969). Samples of 1 gram were suspended in 30% hydrogen peroxide with a Takmar SDT-100N Tissumizer operating at high speed for two 5-sec intervals. The preparations were centrifuged at 2000×G for 15 minutes and the supernatants, 2 hours later, were dialyzed against water that contained catalase and, when hydrogen peroxide was removed, lyophilized. Sufficient catalase (3900 units per mg, Sigma Chemical Co., St. Louis, MO) was added to the dialysis medium to obtain rapid destruction of diffused hydrogen peroxide. To ensure hydrogen peroxide removal dialysis medium that contained catalase was renewed until destruction of hydrogen peroxide ceased.

EXAMPLE 2

Cucurbit seed protein (cucurbitin) was purchased from Nutritional Biochemicals Corp. (Cleveland, OH), and then recrystallized twice by the method of Vickery et al. (H. E. Vickery, E. L. Smith and L. S. Nolan, Biochem. Prep. 2:5, 1952). Samples of 1 gram were suspended in 30% hydrogen peroxide with a Tekmar SDT-100N Tissumizer operating at high speed for two 5-sec intervals. The preparations were centrifuged at 2000×G for 15 minutes and the supernatants, 2 hours later, were dialyzed against water that contained catalase and, when hydrogen peroxide was removed, lyophilized. Sufficient catalase (3900 units per mg, Sigma Chemical Co., St. Louis, MO) was added to the dialysis medium to obtain rapid destruction of diffused hydrogen peroxide. To ensure hydrogen peroxide removal, dialysis medium that contained catalase was renewed until destruction of hydrogen peroxide ceased.

EXAMPLE 3

Soybean protein (11-S component of glycinin) was isolated from hexane-extracted soybean meal according to Briggs and Mann (D. R. Briggs and R. L. Mann, Cereal Chem. 27:243, 1950) and was purified by isoelectric precipitation (W. J. Wolf and D. R. Briggs, Arch. Biochem. Biophys. 85:186, 1959). Samples of 1 gram were suspended in 30% hydrogen peroxide with a Tekmar SDT-100N Tissumizer operating at high speed for two 5-sec intervals. The preparations were centrifuged at 2000×G for 15 minutes and the supernatants, 2 hours later, were dialyzed against water that contained catalase and, when hydrogen peroxide was removed, lyophilized. Sufficient catalase (3900 units per mg, Sigma Chemical Co., St. Louis, MO) was added to the dialysis medium to obtain rapid destruction of diffused hydrogen peroxide. To ensure hydrogen peroxide removal, dialysis medium that contained catalase was renewed until destruction of hydrogen peroxide ceased.

EXAMPLE 4

Example 2 was repeated using 20% $H_2O_2$ instead of 30% $H_2O_2$. Results are shown in comparison in Table I.

EXAMPLE 5

Example 2 was repeated using 10% $H_2O_2$ instead of 30% $H_2O_2$. Results are shown in comparison in Table I.

The results tabulated in Table I clearly show a 100% protein solubilization by 30% $H_2O_2$ and lesser protein solubilization as the concentration of $H_2O_2$ declines. Results obtained from using less than 10% $H_2O_2$ would be considered inadequate.

TABLE I

COMPARISON CONCENTRATIONS OF HYDROGEN PEROXIDE

| % $H_2O_2$ | % of Protein Solubilized by $H_2O_2$ |
|---|---|
| 30 | 100 |
| 20 | 95 |
| 10 | 41 |
| 0 | 2.5 |

OBSERVATIONS

After treatment of dry purified oilseed proteins with concentrated hydrogen peroxide followed by dialysis and freeze-drying, solubilities of the dry oilseed proteins increased as shown in Table II.

TABLE II

PROTEIN SOLUBILITY IN AQUEOUS[a] OR ACIDIC[b] MEDIA

| Protein | Before $H_2O_2$ (mg/mL) | After $H_2O_2$ (mg/mL) | Increase in Solubility |
|---|---|---|---|
| Peanut Protein (arachin) | 7.6 ± 0.01 | 64.8 ± 0.02 | 8.5-fold |
| Cucurbit protein (cucurbitin) | 1.6 ± 0.01 | 65.0 ± 0.03 | 40-fold |
| Soy Protein (11-S (glycinin) | trace[c] | 0.2 ± 0.005 | ca. 200-fold |

[a]Peanut and cucurbit seed proteins in distilled water, pH 6.5.
[b]Acid-insoluble soy protein in 0.05 M acetate buffer, pH 4.7.
[c]Less than 0.001 mg of protein/mL.

In the practice of applicants' invention the following generalizations would apply:

A. When mixing the dry protein with peroxide any of the following means could adequately be employed:
  (1) rapid stirring
  (2) blending with such as a Waring Blender
  (3) homogenizing
  (4) electronic sonication
  (5) rotating disperser (such as applicant used employing a Tissumizer).
B. The mixture could be clarified by:
  (1) allowing the particles to settle by standing and followed by decanting of clear supernatant
  (2) filtration
  (3) centrifugation such as applicant employed.
C. Hydrogen peroxide can be removed by:
  (1) reverse osmosis
  (2) gel filtration
  (3) ammonium sulfate or solvent (acetone, ethanol) precipitation of the protein followed by resuspension in a new solution sans peroxide
  (4) dialysis such as applicant chose.
D. The protein can be dried by:
  (1) air drying
  (2) drying the precipitate formed in C(3)
  (3) freeze drying (lyophilizing) such as applicant employed.

We claim:

1. A process for increasing the solubility of dry purified oilseed protein comprising:
  (a) treating the protein with sufficient $H_2O_2$ to increase the solubility of the protein;
  (b) isolating the solubilized protein from the mixture.

2. The process of claim 1 including the additional step of removing the hydrogen peroxide from the solubilized protein.

3. The process of claim 1 wherein the hydrogen peroxide is from about 10 to 30%.

4. The process of claim 1 wherein the product of (a) is centrifuged for clarification.

5. The process of claim 2 wherein the hydrogen peroxide is removed from the solubilized protein by dialyzing the supernatant against water containing sufficient catalase to remove the hydrogen peroxide and freeze-drying the dialysate.

6. The process of claim 3 wherein the protein to hydrogen peroxide mixture is about 1:20.

7. The process of claim 6 wherein the protein is selected from the group consisting of:
  peanut (arachin);
  pumpkin (cucurbitin); and
  soybean (glycinin).

8. The process of claim 4 wherein the centrifugation is carried out at about 2000 g for about 15 min.

* * * * *